P. A. PAULSON.
PROCESS AND APPARATUS FOR RECLAIMING BY-PRODUCTS.
APPLICATION FILED APR. 12, 1920.
1,393,241.
Patented Oct. 11, 1921.
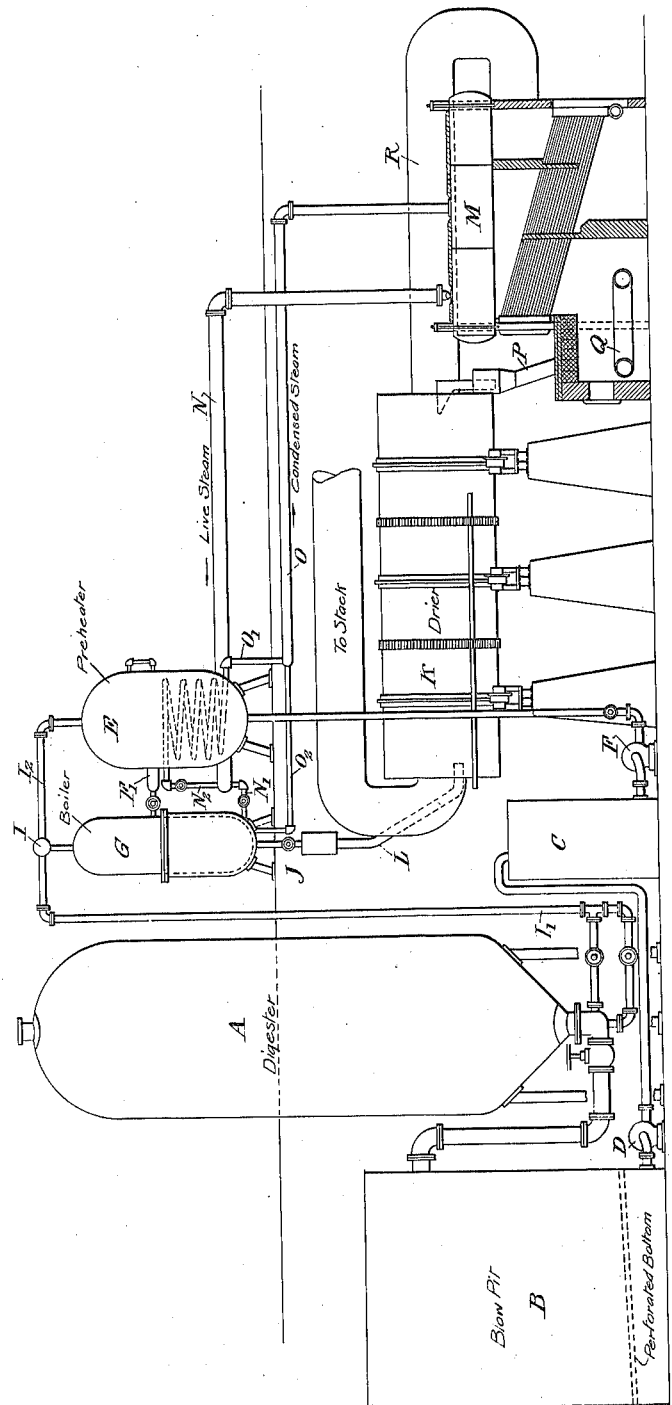

UNITED STATES PATENT OFFICE.

PETER A. PAULSON, OF APPLETON, WISCONSIN.

PROCESS AND APPARATUS FOR RECLAIMING BY-PRODUCTS.

1,393,241.  Specification of Letters Patent.  Patented Oct. 11, 1921.

Application filed April 12, 1920. Serial No. 373,369.

*To all whom it may concern:*

Be it known that I, PETER A. PAULSON, a citizen of the United States, residing at Appleton, in the county of Outagamie and State of Wisconsin, have invented certain new and useful Improvements in Processes and Apparatus for Reclaiming By-Products, of which the following is a specification.

My invention relates to a process and an apparatus for reclaiming by-products from sulfite mills.

When wood is treated with dilute acid under pressure and at high temperature, the incrusting matter of the cellulose is dissolved, leaving the cellulose free in the form of small fibers which are valuable as a paper making material. A well known process for manufacturing cellulose is the sulfite process by which there are manufactured about 5500 tons daily in the United States.

The incrusting matter which consists mainly of lignin and other resinous matter and represents not less than fifty per cent. of the wood, remains in solution, and is allowed to run into the sewers or rivers. Not only is this waste a public nuisance on account of pollution of the river water, and detrimental to the life of the fish in the same, but it is of great economic importance. Separated from the water, lignin has a fuel value almost equal to that of coal.

Numerous attempts have been made to make use of this material and some have been successful to a very small degree, but in all instances it has been found that the small demand for such purposes as it can be used, does not warrant the expense in putting it on the market. Attempts have also been made to remove the water by evaporation, but in all known methods to date, the water evaporated is again condensed and allowed to go to waste. The cost, therefore, makes the present method of evaporating prohibitive.

It is the purpose of my invention to provide a method whereby the lignin and other resinous matter present in waste sulfite liquor can be removed at a very small cost, and whereby the lignin and other resinous matter thus obtained can be made fit for fuel purposes, which will more than offset the cost of operation, and also to provide a method for reclaiming the sulfur dioxid present in the waste sulfite liquor, and make use of it in the cooking process. The process is explained as follows:

In the accompanying drawing, A, represents a digester such as is commonly used in the sulfite process; B represents a blow-pit into which the cooked pulp is blown from digester A. The blow-pit serves the purpose of separating the waste liquor from the cellulose or "pulp"; the waste liquor drains out through the perforated bottom indicated in dotted lines, leaving the pulp behind. Instead of allowing the waste liquor to go to the sewer, I pump it into a storage tank C by means of pump D. From tank C the liquor is pumped to a preheater E by means of pump F. Preheater E is provided internally with a steam coil of sufficient heating surface to heat the liquor to any desired temperature. I prefer a plurality of boilers G because the best efficiency can be obtained with a small size. The steam generated and $SO_2$ liberated in boiler G passes to main header I, and from there to digester A through pipe $I_1$ and also to top of preheater E through pipe $I_2$. The pipe $I_2$ maintains equilibrium of pressure between boiler G and preheater E, thereby permitting the preheated liquor to flow, through pipe $F_1$, from the preheater to the boiler by gravity. The residue leaves boiler G through pipe J, and passes to drier K through pipe L. The steam which is ordinarily used for cooking the pulp in digester A is used for preheating the liquor in preheater E, and boiling it in boiler G. This steam is generated in a steam boiler M, having a fire-box and grate or stoker Q of any suitable construction. The steam passes from boiler M through main steam pipe N, entering the steam jacket of boiler G, and the steam coil in preheater E through pipes $N_1$ and $N_2$ respectively. The condensed steam from coil in preheater E and jacket on boiler G leaves through pipes $O_1$ and $O_2$ and returns to steam boiler M through return pipe O.

The hot products of combustion from steam boiler M which are used to dry the residue, enter the drier at the end from which the dried residue is leaving, and connection is made from the opposite end to the chimney, or if artificial draft is used, to the fan. The dried residue may be conveyed directly to the stokers for steam boiler M, or mixed with sawdust, coal or other refuse fuel material available. This dried residue, where calcium bisulfite is used for cooking contains about 1% of lime, which will be left in the ashes in the fire-box, from which it may be recovered or otherwise utilized.

The wood is treated in the digester in the manner and by the reagents well known to those familiar with the art.

The advantages of the method of handling sulfite liquor above described are that the pollution of streams and rivers is obviated, that a large amount of hitherto wasted sulfur dioxid is reclaimed, and that sufficient fuel which has hitherto been wasted, is recovered to largely or entirely obviate the need for any additional fuel.

I claim:—

1. The method of treating waste sulfite liquor which consists in heating the same to generate steam and drive off sulfur dioxid under suitable conditions of temperature and pressure, whereby the lignin and other resinous matters are precipitated, and using the steam and sulfur dioxid thus produced for cooking wood pulp in a digester.

2. The method of treating sulfite liquor which consists in heating the liquor under pressure to precipitate lignin and other resinous material, burning the precipitated material in a steam generator, using the steam from said generator to heat the waste liquor, and using the steam and sulfur dioxid thus produced for cooking wood pulp under pressure in a digester.

3. The method of treating sulfite liquor which consists in heating the liquor under pressure to precipitate lignin and other resinous matter, drying the precipitated material, burning the dried precipitate in a steam generator, utilizing the waste gases from said generator to dry the precipitated material, using the steam from said generator to heat the liquor, and conducting the steam and sulfur dioxid given off during the heating of the liquor to a digester.

4. The combination with a digester of means for boiling the waste sulfite liquor comprising a connected preheater and liquor boiler and means for heating the same by indirect steam, means for collecting and delivering the waste liquor to the boiling means, and a pipe leading from the liquor boiler to the digester, said means for heating by indirect steam comprising a steam boiler having a firebox, means for delivering combustible material thereto comprising a drier, means for delivering products of combustion from the firebox to the drier, and means for delivering material to the drier from the liquor boiler.

5. An apparatus for reclaiming by-products in sulfite mills, comprising means for boiling sulfite liquor, means for delivering sulfite liquor thereto, a drier, means for delivering material to be dried from the boiling means to the drier, a steam generator having a fire-box, means for delivering dried material from the drier to the fire-box, a conduit for delivering products of combustion from the firebox to the drier, a steam pipe leading from the steam generator to the boiling means, and pipes leading from said boiling means, said pipes being adapted to convey steam and sulfur dioxid to a digester.

In testimony whereof, I affix my signature.

PETER A. PAULSON.